US012566752B2

(12) United States Patent
Franklin et al.

(10) Patent No.: US 12,566,752 B2
(45) Date of Patent: *Mar. 3, 2026

(54) MATCHING AND MERGING USING METADATA CONFIGURATION BASED ON AN N-LAYER MODEL

(71) Applicant: Reltio, Inc., Redwood Shores, CA (US)

(72) Inventors: Martin Franklin, San Diego, CA (US); Manish Sood, Seattle, WA (US)

(73) Assignee: Reltio, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,219

(22) Filed: Jun. 16, 2023

(65) Prior Publication Data

US 2023/0409563 A1 Dec. 21, 2023

Related U.S. Application Data

(60) Provisional application No. 63/353,005, filed on Jun. 16, 2022.

(51) Int. Cl.
| | |
|---|---|
| *G06F 16/23* | (2019.01) |
| *G06F 16/21* | (2019.01) |
| *G06F 16/25* | (2019.01) |
| *G06F 16/28* | (2019.01) |

(52) U.S. Cl.
CPC ........ *G06F 16/2379* (2019.01); *G06F 16/219* (2019.01); *G06F 16/256* (2019.01); *G06F 16/288* (2019.01)

(58) Field of Classification Search
CPC .. G06F 16/2379; G06F 16/219; G06F 16/256; G06F 16/288
See application file for complete search history.

(56) References Cited

U.S. PATENT DOCUMENTS

| | | | | |
|---|---|---|---|---|
| 9,009,029 | B1 * | 4/2015 | Michalak | G06F 40/295 |
| | | | | 715/256 |
| 10,733,157 | B1 * | 8/2020 | Johnston | G06F 3/0481 |
| 2014/0351205 | A1 * | 11/2014 | Fennell | G06F 16/22 |
| | | | | 707/736 |
| 2015/0213380 | A1 * | 7/2015 | Cooper | G06Q 50/06 |
| | | | | 705/7.11 |
| 2017/0154067 | A1 * | 6/2017 | Hazlewood | G06F 16/2365 |
| 2017/0223003 | A1 * | 8/2017 | Miles | H04L 63/02 |

(Continued)

*Primary Examiner* — Alicia M Willoughby

(74) *Attorney, Agent, or Firm* — Ahmann Kloke LLP

(57) ABSTRACT

Among other techniques, techniques for dynamic survivorship, cross-tenant matching, and lineage entity identifier (EID) promotion are described. A system utilizing these techniques can include an EID assignment engine, a progressive stitching engine, and a data item update engine. The progressive stitching engine can be at least conceptually characterized as comprising a data point onboarding subengine, a data point registration subengine, a data point matching subengine, and a data point merging subengine. A method utilizing these techniques can include assigning a data item EID to a data item, onboarding a data point, assigning a data point EID to the data point, matching the data point with the data item in a multitenant EID lineage-persistent relational database management system (RDBMS), merging the data point with the data item to create a merged data item, and changing the data item, triggering survivorship and lineage EID promotion rules.

20 Claims, 7 Drawing Sheets

Platform 102

(56)     References Cited

U.S. PATENT DOCUMENTS

2018/0276280  A1*   9/2018  Trudel  ................ G06F 16/2456
2019/0325061  A1*  10/2019  Poirel  .................. G06F 16/907
2023/0418825  A1*  12/2023  Berkner  ............ G06F 16/24564

* cited by examiner

Platform 102

L3 Customer Accessible Layer 302

L2 Industry-Focused Layer 304

L1 Industry-Agnostic Layer 306

FIG. 3

Entity Type (Individual) 402

Alyssa

Relationship Type 404

Entity Type 406

Entity Type 408

Interaction 410 (Event)

Create match rules  502

Identify attributes from entity types for matching  504

Create comparison formula  506

Map token generator classes  508

Declare thresholds — 602

Create match rule — 604

Assign weights to one or more attributes — 606

Score comparison of entities — 608

Utilize match token classes for comparisons — 610

Create model flow          702

Train model          704

Curate results          706

Publish model          708

MATCHING AND MERGING USING METADATA CONFIGURATION BASED ON AN N-LAYER MODEL

CROSS-REFERENCE TO RELATED APPLICATIONS

The present application claims priority to U.S. Provisional Patent Application Ser. No. 63/353,005 filed Jun. 16, 2022, which is incorporated by reference herein.

BACKGROUND

As used in Master Data Management (MDM) and Data Quality Management (DQM), a "golden record" is a representation of a real-world entity. In a specific implementation, a "golden record" has multiple views of any object depending on a viewer's account and survivorship rules associated therewith. It is understood that changing golden records in a datastore is an O(n), or linear process. Big O notation, or asymptotic notation, is a mathematical notation that describes the limiting behavior of a function when the argument tends towards a particular value or infinity. Asymptotic notation characterizes functions according to their growth rates. In a big data context, it would normally be necessary to shut down a system to integrate a new data set (e.g., a third-party data set) into an existing one.

BRIEF DESCRIPTION OF THE DRAWINGS

FIG. 3 depicts a three-layer model in some embodiments.

DETAILED DESCRIPTION

A unique architecture enables efficient modelling of entities, relationships, and interactions that typically form the basis of a business. These models enable insights, scalability, and management not previously available in the prior art. It will be appreciated that with the information model discussed herein, there is no need to consider tables, foreign keys, or any of the low-level physicality of how the data is stored.

An information model may be utilized as a part of a multi-tenant platform. In a specific implementation, a configuration sits in a layer on top of the RELTIO™ platform and natively enjoys capabilities provided by the platform such as matching, merging, cleansing, standardization, workflow, and so on. Entities established in a tenant may be associated with custom and/or standard interactions of the platform. The ability to hold and link three kinds of data (i.e., entities, relationships, and interactions) in the platform and leverage the confluence of them in one place provides power to model and understanding to a business.

Entities established in a tenant may be associated with custom and/or standard interactions of the platform. The ability to hold and link three kinds of data (i.e., entities, relationships, and interactions) in the platform and leverage the confluence of them in one place provides unlimited power to model and understanding to a business.

In various embodiments, the metadata configuration is based on an n-layer model. One example is a 3-layer model (e.g., which is the default arrangement). In some embodiments, each layer is represented by a JSON file (although it will be appreciated that many different file structures may be utilized such as B SON or YAML).

Figure 1:
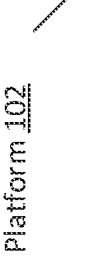
FIG. 1 depicts a connected data platform.

The information models may be utilized as a part of a connected, multi-tenant system. FIG. 1 depicts a platform 102. The data platform enables seamless scaling in many operational or analytical use case. The platform 102 may be the foundation of master data management (MDM). Various integration options, including a low-code/no-code solution, allow rapid deployment and time to value.

FIG. 1 is an example of functions of the platform 102 in some embodiments. The platform 102 may support best in class MDM capabilities, including identity resolution, data quality, dynamic survivorship for contextual profiles, universal ID across all your operational applications and hierarchies, knowledge graph to manage relationships, progressive stitching to create richer profiles, and governance capabilities. Further, the platform 102 may support high volume transactions, high volume API calls, sophisticated analytics, and back-end jobs for any workload in an auto-scaling cloud environment. As follows, the platform 102 may support high redundancy, fault tolerance, and availability with built-in NoSQL database, Elasticsearch, Spark, and other AWS and GCP services across multiple zones.

In various embodiments, the platform 102 is multi-domain and enables seamless integration of many types of data and from many sources to create master profiles of any data entity—person, organization, product, location. Users can create master profiles for consumers, B2B customers, products, assets, sites, and connect them to see the complete picture.

The platform 102 may enable API-first approach to data integration and orchestration. Users (e.g., tenants) can use APIs, and various application-specific connectors to ease integration. Additionally, in some embodiments, users can stream data to analytics or data science platforms for immediate insights.

Figure 2:
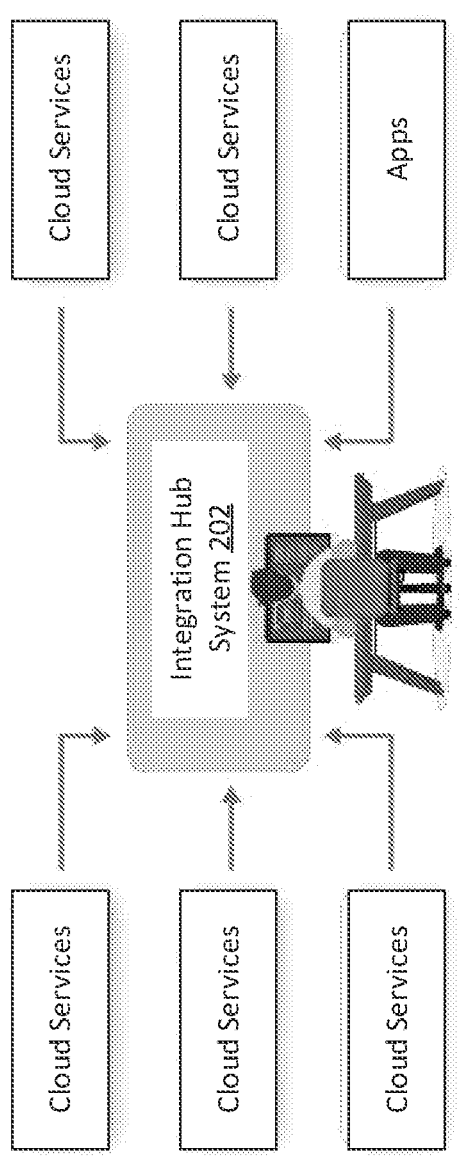
FIG. 2 depicts an environment for an integration hub system.

FIG. 2 depicts an environment for an integration hub system 202. The integration hub system 202 may connect various data sources and downstream consumers. In some embodiments, the integration hub system 202 comes with over 1,000 connectors to build data pipelines right. The integration hub system 202 may include an intuitive drag-and-drop graphical interface to create simple replication pipelines to complex data extraction and transformation tasks. With pre-built community recipes for common use cases, users can set up integration workflows in just a few clicks.

Along with the built-in data loader, event streaming capabilities, data APIs, and partner connectors, the integration hub system 202 enables rapid links to user systems using the platform 102. The integration hub system 202 may enable users to build automated workflows to get data to and from the platform 102 with any number of SaaS applications in just hours or days. Faster integration enables faster access to unified, trusted data to drive real-time business operations.

Figure 3:
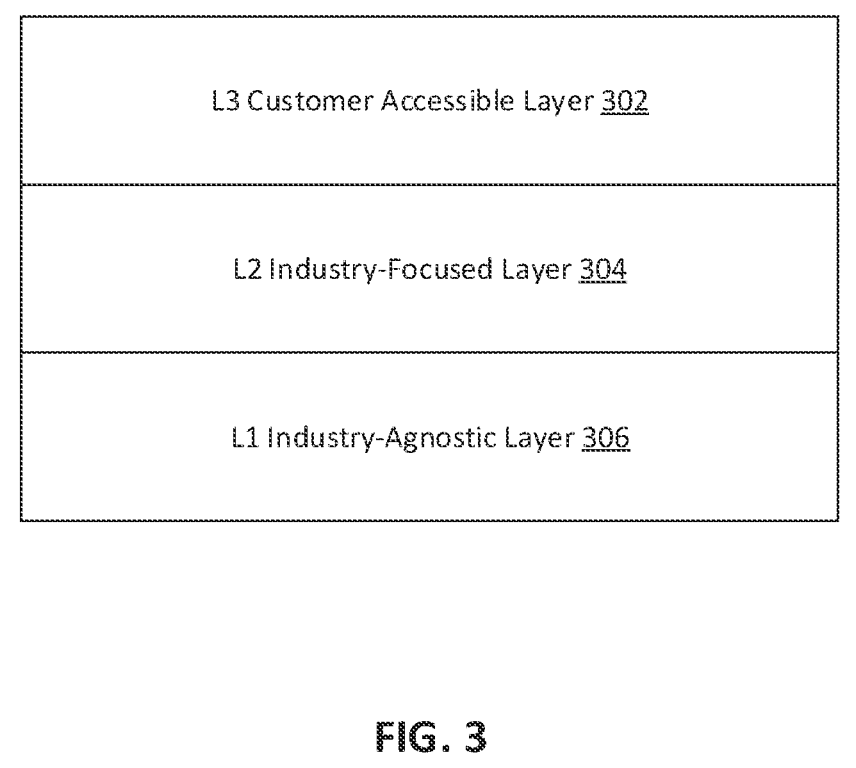

FIG. 3 depicts a three-layer model in some embodiments. Of the three layers, only layer 3 (e.g., the top layer of the n-layer model) 302, known as the "L3" is accessible by the customer. It is the layer that is a part of a tenant. The information associated with the L3 layer 302 may be retrieved from the tenant, edited. and applied back to the tenant using Configuration API.

The L3 302 layer typically inherits from the L2 layer 304 (an industry-focused layer) which in turn inherits from the L1 layer 306 (An industry-agnostic layer). Usually, the L3 layer 302 refers to an L2 304 container and inherits all data items (or "objects") from the L2 304 container. However, it is not required that the L3 302 refer to the L2 304 container, it can standalone.

The L2 layer 304 may inherit the objects from the L1 layer. Whereas there is only a single L1 306 set of objects, the objects at the L2 layer 304 may be grouped into industry-specific containers. Like the L1 layer 306, the containers at the L2 layer 304 may be controlled by product management and may not be accessible by customers.

Life sciences is a good example of an L2 layer 304 container. The L2 layer 304 container 304 may inherit the Organization entity type (discussed further herein) from L1 layer 306 and extends it to the Health Care Organization (HCO) type needed in life sciences. As such, the HCO type enjoys all of the attribution and other properties of the Organization type, but defines additional attributes and properties needed by an HCO.

The L1 layer 306 may contain entities such as Party (an abstract type) and Location. In some embodiments, the L1 layer 306 contains a fundamental relationship type called HasAddress that links the Party type to the Location type. The L1 layer 306 also extends the Party type to Organization and Individual (both are non-abstract types).

There may be only one L1 layer 306, and its role is to define industry-agnostic objects that can be inherited and utilized by industry specific layers that sit at the L2 layer 304. This enables enhancement of the objects in the L1 layer 306, potentially affecting all customers. For example, if an additional attribute was added into the HasAddress relationship type, it typically would be available for immediate use by any customer of the platform.

Any object can be defined in any layer. It is the consolidated configuration resulting from the inheritance between the three layers that is commonly referred to as the tenant configuration or metadata configuration. In a specific implementation, metadata configuration consolidates simple, nested, and reference attributes from all the related layers. Values described in the higher layer overrides the values from the lower layers. The number of layers does not affect the inheritance.

In a specific implementation, metadata configuration consolidates simple, nested, and reference attributes from all the related layers. Values described in the higher layer overrides the values from the lower layers. The number of layers does not affect the inheritance.

Figure 4:
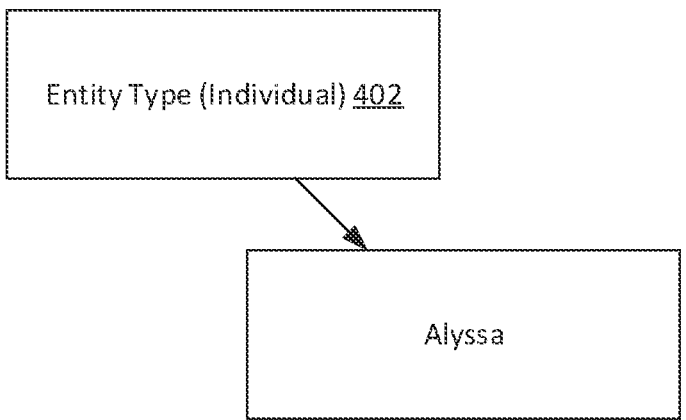
FIG. 4 is a box diagram of some examples of entity type, relationship type and event metadata.
Figure 4:
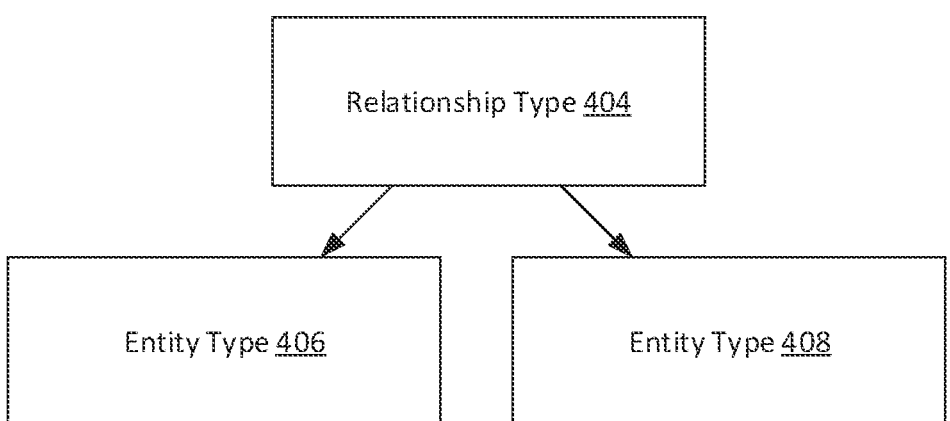

FIG. 4 is a box diagram of some examples of entity type, relationship type and event metadata. The platform 102 enables object types entities, relationships, and interactions. The entity type 402 may be a class of entity. For example, "Individual" is an entity type 402, and "Alyssa" represents a specific instance of that entity type. Other common examples of entity types include "Organization," "Location," and "Product."

Often, entity types can materialize in single instances, such as the "Alyssa" example above. In another example, the L1 layer may define the abstract "Party" entity type with a small collection of attributes. The L1 layer may then be configured to define the "Individual" entity type and the "Organization" entity type, both of which inherit from "Party," both of which are non-abstract and both of which add additional attributes specific to their type and business function. Continuing with the concept of inheritance, in the L2 Life Sciences container, the HCP entity may be defined (to represent physicians) which inherits from the "Individual" type but also defines a small collection of attributes unique to the HCP concept. Thus, there is an entity taxonomy "Party," "Individual," or "HCP," and the resulting HCP entity type provides the developer and user with the aggregate attribution of "Party," "Individual," and "HCP."

Once the entity types are defined, the user can link entities together in a data model by using the relationship type. Once the user defines entity types, they can be linked by defining relationships between them. For example, a user can post a relationship independently to link two entities together, or the client can mention a relationship in a JSON, which then posts the relationship and the two entities all at once.

A relationship type 404 describes the links or connections between two specific entities (e.g., entities 406 and 408). A relationship type 404 and the entities 406 and 408 described together form a graph. Some common relationship types are Organization to Organization, Subsidiary Of, Partner Of, Individual to Individual, Parent of/Child Of, Reports To, Individual to Organization/Organization to Individual, Affiliated With, Employee Of/Contractor Of.

Once the user defines entity types, they can be linked by defining relationships between them. For example, a user can post a relationship independently to link two entities together, or the client can mention a relationship in a JSON, which then posts the relationship and the two entities all at once.

The platform 102 may enable the user to define metadata properties and attributes for relationship types. The user can define up to any number metadata properties. The user can also define several attributes for a relationship type, such as name, description, direction (undirected, directed, bi-directional), start and end entities, and more. Attributes of one relationship type can inherit attributes from other relationship types.

Hierarchies may be defined through the definition of relationship subtypes. For example, if a user defines "Family" as a relationship type, the user can define "Parent" as a subtype. One hierarchy contains one or many relationship types; all the entities connected by these relationships form a hierarchy. Entity A>HasChild (Entity B)>HasChild (Entity C). Then A, B, and C form a hierarchy. In the same hierarchy, the user can add Subsidiary as a relationship and if Entity D is subsidiary of Entity C, then A, B, C, and D all become part of a single hierarchy.

Interactions 410 are lightweight objects that represent any kind of interaction or transaction. As a broad term, interaction 410 stands for an event that occurs at a particular moment such as a retail purchase or a measurement. It can also represent a fact in a period of time such as a sales figure for the month of June.

Interactions 410 may have multiple actors (entities), and can have varying record lengths, columns, and formats. The data model may be defined using attribute types. As a result, the user can build a logical data model rather than relying on physical tables and foreign keys; define entities, relationships, and interactions in granular detail; make detailed data available to content and interaction designers; provide business users with rich, yet streamlined, search and navigation experiences.

In various embodiments, four manifestations of the attribute type include Simple, Nested, Reference, and Analytic. The simple attribute type represents a single characteristic of an entity, relationship, or interaction. The nested, reference and analytic attribute types represent combinations or collections of simple sub-attribute types.

The nested attribute type is used to create collections of simple attributes. For example, a phone number is a nested attribute. The sub-attributes of a phone number typically include Number, Type, Area code, Extension. In the example of a phone number, the sub-attributes are only meaningful when held together as a collection. When posted as a nested attribute, the entire collection represents a single instance, or value, of the nested attribute. Posts of additional collections are also valid and serve to accumulate additional nested attributes within the entity, relationship or interaction data type.

The reference attribute type facilitates easy definition of relationships between entity types in a data model.

A user may utilize the reference attribute type when they need one entity to make use of the attributes of another entity without natively defining the attributes of both. For example, the L1 layer in the information model defines a relationship that links an Organization and an Individual using the affiliatedwith relationship type. The affiliatedwith relationship type defines the Organization entity type to be a reference attribute of the Individual entity type. This approach to data modeling enables easier navigation between entities and easier refined search.

Easier navigation between entities: In the example of the Organization and Individual entities that are related using the affiliatedwith relationship type, specifying an attribute of previous employer for the Individual entity type enables this attribute to be presented as a hyperlink on the individual's profile facet. From there, the user can navigate easily to the individual's previous employer.

Easily refined search: When attributes of a referenced entity and relationship type are available to be indexed as though they were native to the referencing entity, business users can more easily refine search queries. For example, in a search of a data set that contains 100 John Smith records, entering John Smith in the search box will return 100 John Smith records. Adding Acme to the search criteria will return only those records with John Smith that have a reference, and thus an attribute, that contains the word Acme.

The analytic attribute type is lightweight. In various embodiments, it is not managed in the same way that other attributes are managed when records come together during a merge operation. The analytic attribute type may be used to receive and hold values delivered by an analytics solution.

The user may utilize the analytic attribute type when they want to make a value from your analytics solution, such as Reltio Insights, available to a business user or to other applications using the Reltio Rest API. For example, if an analytics implementation calculates a customer's lifetime value and the user needs that value to be available to the user while they are looking at the customer's profile, the user may define an analytic attribute to hold this value and provide instructions to deliver the result of the calculation to this attribute.

In a specific implementation, the platform 102 assigns entity IDs (EIDs) to each item of data that enters the platform. As such, the platform can appropriately be characterized as including an EID assignment engine. Importantly, a lineage-persistent relational database management system (RDBMS) retains the EIDs for each piece of data, even if the data is merged and/or assigned a new EID. As such, the platform can appropriately be characterized as including a legacy EID retention engine, which has the task of ensuring when new EIDs are assigned, legacy EIDs are retained in a legacy EID datastore. The legacy EID retention engine can at least conceptually be divided into a legacy EID survivorship subengine responsible for retaining all EIDs that are not promoted to primary EID as legacy EIDs and a lineage EID promotion subengine responsible for promoting an EID of a first data item merged with a second data item to primary EID of the merged data item. An engine responsible for changing data items, including merging and unmerging (previously merged) data items can be characterized as a data item update engine. Cross-tenant durability also becomes possible when legacy EIDs are retained. In a specific implementation, a cross-tenant durable EID lineage-persistent RDBMS has an n-Layer architecture, such as a 3-Layer architecture.

Data may come from multiple sources. The process of receiving data items can be referred to as "onboarding" and, as such, the platform 102 can be characterized as including a new dataset onboarding engine. Each data source is registered and, in a specific implementation, all data that is ultimately loaded into a tenant will be associated with a data source. If no source is specified when creating a data item (or "object"), the source may have a default value. As such, the platform can be characterized as including an object registration engine that registers data items in association with their source.

A crosswalk can represent a data provider or a non-data provider. Data providers supply attribute values for an object and the attributes are associated with the crosswalk. Non-data providers are associated with an overall entity (or relationship); it may be used to link an L1 (or L2) object with an object in another system. Crosswalks do not necessarily just apply to the entity level; each supplied attribute can be associated with data provider crosswalks. Crosswalks are analogous to the Primary Key or Unique Identifier in the RDBMS industry.

The engines and datastores of the platform 102 can be connected using a computer-readable medium (CRM). A CRM is intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented as cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations, while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

Matching is a powerful area of functionality and can be leveraged in various ways to support different needs. The classic scenario is that of matching and merging entities (Profiles). Within the architecture discussed herein, relationships that link entities can also and often do match and merge into a single relationship. This may occur automatically and is discussed herein.

Matching can be used on profiles within a tenant to deduplicate them. It can be used externally from the tenant on records in a file to identify records within that file that match to profiles within a tenant. Matching may also be used to match profiles stored within a Data Tenant to those within a tenant.

Figure 5:
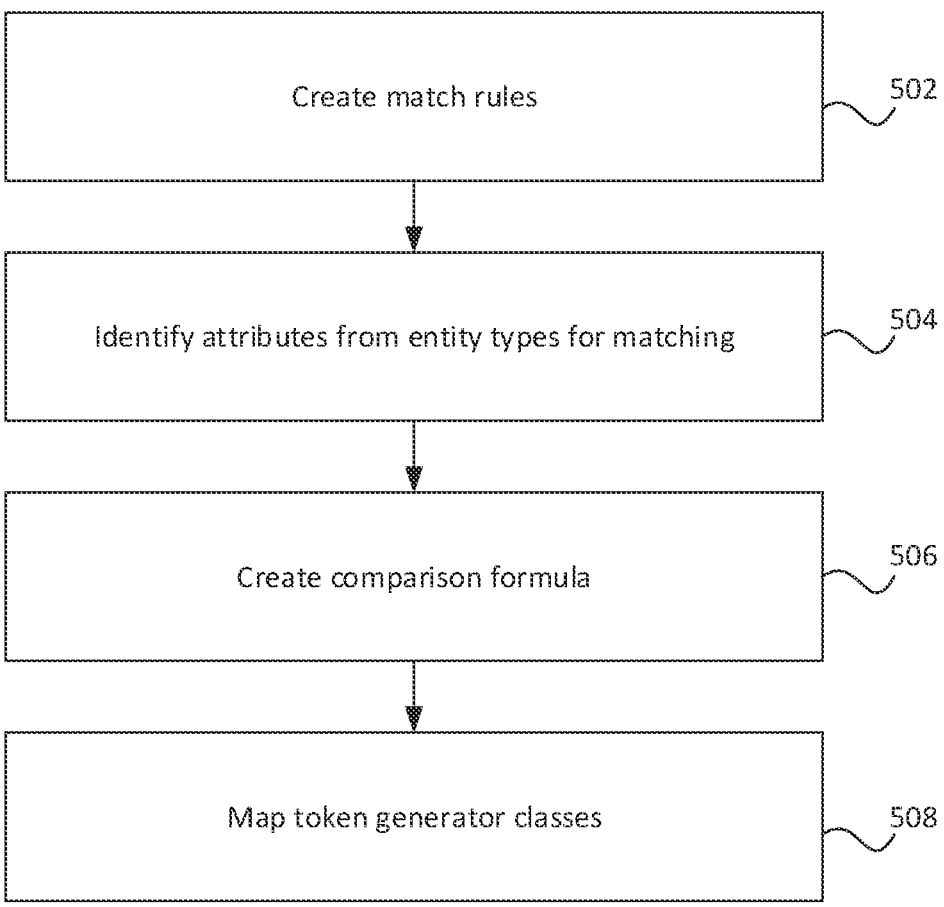
FIG. 5 depicts a dynamic matching facilitation flowchart.

FIG. 5 depicts a dynamic matching facilitation flowchart. The match architecture is responsible for identifying profiles within the tenant that are considered to be semantically the same or similar. A user may establish a match scheme using the match configuration framework. In some embodiments, the user may utilize machine learning techniques to match profiles. In step 502, the user may create match rules. In step 504, the user may identify the attributes from entity types they wish to use for matching. In step 506, the user may write a comparison formula within each match rule which is responsible for doing the actual work of comparing one profile to another. In step 508, the user may map token generator classes that will be responsible for creating match candidates.

Unlike other systems, in various embodiments, the architecture is designed to operate in real-time. Prior to the match process and merge processes occurring, every profile created or updated is may be cleansed on-the-fly by the profile-level cleansers. Thus the 3-step sequence of cleanse, match, merge may be designed to all occur in real-time anytime a profile is created or updated. This behavior makes the platform 102 ideal for real-time operational use within a customer's ecosystem.

Lastly, the survivorship architecture is responsible for creating the classic "golden record", but in a specific implementation, it is a view, materialized on-the-fly. It is returned to any API call fetching the profile and contains a set of "Operational Values" from the profile, which are selected in real-time based on survivorship rules defined for the entity type.

In various embodiments, matching may operate continuously and in real-time. For example, when a user creates or updates a record in the tenant, the platform cleanses and processes the record to find matches within the existing set of records.

Each entity type (e.g., contact, organization, product) may have its own set of match groups. In some embodiments, each match group holds a single rule along with other properties that dictate the behavior of the rule within that group. Comparison Operators (e.g., Exact, ExactOrNull, and Fuzzy) and attributes may comprise a single rule.

Match tokens may be utilized to help the match engine quickly find candidate match values. A comparison formula within a match rule may be used to adjudicate a candidate match pair and will evaluate to true or false (or a score if matching is based on relevance).

In some embodiments, the matching function may do one of three things with a pair of records: Nothing (if the comparison formula determines that there is no match); Issue a directive to merge the pair; Issue a directive to queue the pair for review by a data steward. In some embodiments, the architecture may include the following:

1) Entities and relationships each have configurable attribution capability.

2) Values found in an attribute are associated with a crosswalk held within an entity or relationship object. Each profile can have multiple crosswalks, each contributing one or more values. Data may come from multiple sources. Each source may be registered, and all data loaded into a tenant will be associated with a data source. Each supplied attribute may be associated with data provider crosswalks. Crosswalks are analogous to the Primary Key or Unique Identifier in relational database management system (RDBMS). A crosswalk can represent a data provider or a non-data provider.

3) Data providers supply attribute values for an object and the attributes are associated with the crosswalk.

4) Non-data providers are associated with an overall entity (or relationship). In this case it is simply used to link a Reltio object with an object in another system. Supplied attributes may NOT be associated with this crosswalk.

5) Profiles can be matched and merged, but relationships are also matched and merged. While the user may develop match rules to govern the matching and merging of profiles, merging of relationships is automatic and intrinsic to the platform. Any two relationships of the same type, that each have entity A at one endpoint and entity B at their other endpoint, will merge automatically.

6) An attribute is intrinsically multi-valued, meaning it can hold multiple values. This means any attribute can collect and store multiple values from contributing sources or through merging of additional crosswalks. Thus, if a match rule utilizes the first name attribute, then the match engine will by default, compare all values held within the first name attribute of record A to all values held within the first name attribute of record B, looking for matches among the values. The user may elect to only match on operational values if desired.

7) When two profiles merge, the resulting profile contains the aggregate of all the crosswalks of the two contributing profiles and thus the associated attributes and values from those crosswalks. The arrays behind the attributes naturally merge as well, producing for each attribute an array that holds the aggregation of all the values from the contributing attributes. Relationships benefit from the same architecture and behave in the same manner as described for merged entities. The surviving entity ID (or relationship ID) for the merged profile (or relationship) is that of the oldest of the two contributors. Other than that, there really isn't a concept of a winner object and a loser object.

8) When two profiles merge the resulting profile contains references to all the interactions that were previously associated with the contributing profiles. (Note that Interactions do not reference relationships.)

9) If profile B is unmerged from the previous merge of A and B, then B will be reinstated with its original entity ID. All of the attributes (and associated values), relationships, and interactions profile B brought into the merged profile will be removed from the merged profile and returned to profile B.

The matchGroups construct is a collection of match groups with rules and operators that are needed for proper matching. If the user needs to enable matching for a specific entity type in a tenant, then the user may include the matchGroups section within the definition of the entity type in the metadata configuration of the tenant. The matchGroups section will contain one or more match groups, each containing a single rule and other elements that support the rule.

Looking at a match group in a JSON editor, the user can easily see the high-level, classic elements within it. The rule may define a Boolean formula (see the and operator that anchors the Boolean formula in this example) for evaluating the similarity of a pair of profiles given to the match group for evaluation. It is also within the rule element that four other very common elements may be held: ignoreInToken (optional), Cleanse (optional), matchTokenClasses (required), and comparatorClasses (required). The remaining elements that are visible (URI, label, and so on), and some not shown in the snapshot, surround the rule and provide additional declarations that affect the behavior of the group and in essence, the rule.

Each match group may be designated to be one of four types: automatic, suspect, <custom>, and relevance_based described below. The type the user selects may govern whether the user develops a Boolean expression for the comparison rule or an arithmetic expression. The types are described below.

Behavior of the automatic type: With this setting for type, the comparison formula is purely Boolean and if it evaluates to TRUE, the match group will issue a directive of merge which, unless overridden through precedence, will cause the candidate pair to merge.

Behavior of the suspect type: With this setting for type, the comparison formula is purely Boolean and if it evaluates to TRUE, the match group will issue a directive of queue for review which, unless overridden through precedence, will cause the candidate pair to appear in the "Potential Matches View" of the MDM UI.

Behavior of the relevance_based type: Unlike the preceding rules, all of which are based on a Boolean construction of the rule formula, the relevance-based type expects the user to define an arithmetic scoring algorithm. The range of the match score determines whether to merge records automatically or create potential matches.

If a negativeRule exists in the matchGroups and it evaluates to true, any merge directives from the other rules are demoted to queue for review. Thus, in that circumstance, no automatic merges will occur. The Scope parameter of a match group defines whether the rule should be used for Internal Matching or External Matching or both. External matching occurs in a non-invasive manner and the results of the match job are written to an output file for the user to review. Values for Scope are: ALL—Match group is enabled for internal and external matching (Default setting). NONE—Matching is disabled for the match group. INTERNAL—Match group is enabled for matching records within the tenant only. EXTERNAL—Match group is enabled only for matching of records from an external file to records within the tenant; in a specific implementation, external matching is supported programmatically via an External Match API and available through an External Match Application found within a console, such as a RELTIO™ Console.

If set to true, then only the OV of each attribute will be used for tokenization and for comparisons. For example, if the First Name attribute contains "Bill", "William", "Billy", but "William" is the OV, then only "William" will be considered by the cleanse, token, and comparator classes.

The rule is the primary component within the match group. It contains the following key elements each described in detail: IgnoreInToken, Cleanse, matchTokenClasses, comparatorClasses, Comparison formula.

A negative rule allows a user to prevent any other rule from merging records. A match group can have a rule or a negative rule. The negative rule has the same architecture as a rule but has the special behavior that if it evaluates to true, it will demote any directive of merge coming from another match group to queue for review. To be sure, most match groups across most customers' configurations use a rule for most matching goals. But in some situations, it can be advantageous to additionally dedicate one or more match groups to supporting a negative rule for the purpose of stopping a merge based on usually a single condition. And when the condition is met, the negative rule prevents any other rule from merging the records. So in practice, the user might have seven match groups each of which use a rule, while the eighth group uses a negative rule.

The platform 102 may include a mechanism to proactively monitor match rules in tenants across all environments. In some embodiments, after data is loaded into the tenant, the proactive monitoring system inspects every rule in the tenant over a period of time and the findings are recorded. Based on the percentage of entities failing the inspections, the proactive monitoring system detects and bypasses match rules that might cause performance issues and the client may be will be notified. The bypassed match rules will not participate in the matching process.

In various embodiments, the user receives a notification when the proactive monitoring system detects a match rule that needs review. ScoreStandalone and scoreIncemental elements may be used to calculate a Match Score for a profile that is designated as a potential match and can assist a data steward when reviewing potential matches.

Relevance-based matching is designed primarily as a replacement of the strategy that uses automatic and suspect rule types. With Relevance-based matching, the client may create a scoring algorithm of the user's own design. The advantage is that in most cases, a strategy based on Relevance-based matching can reduce the complexity and overall number of rules. The reason for this is that the two directives of merge and queue for review which normally require separate rules (automatic and suspect respectively) can often be represented by a single Relevance-Based rule.

Figure 6:
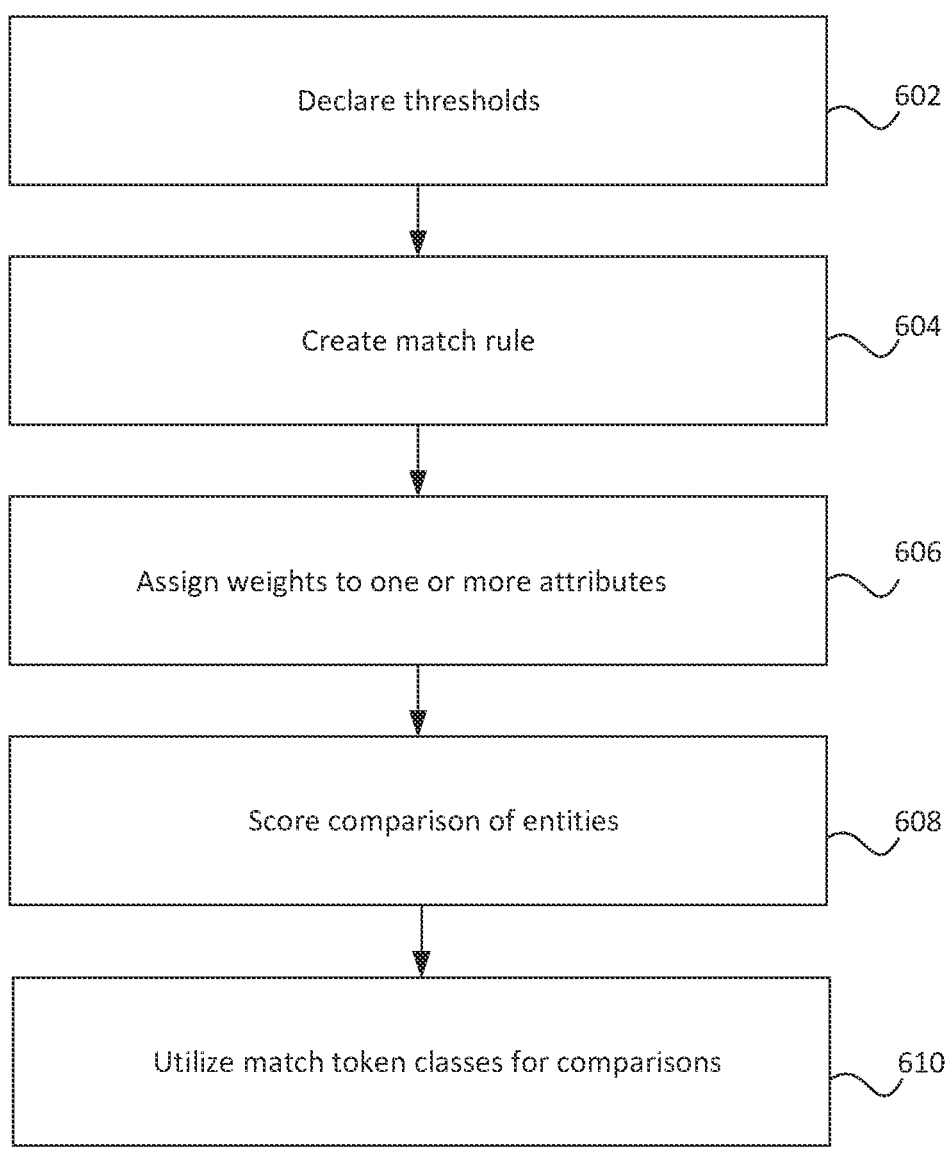
FIG. 6 depicts a dynamic matching flowchart.

FIG. 6 depicts a dynamic matching flowchart. In step 602, thresholds may be defined. For example, when declaring the ranges for queue for review and auto_merge, the combination should span the entire available range of 0.0 to 1.0 with no gap and no overlap except that the upper endpoint for queue for review should equal the lower endpoint for auto_merge thus have a common touchpoint between them (for example, 0.0 to 0.6 for queue for review, and 0.6 to 1.0 for auto_merge). If the actionThresholds leave a gap, then any score falling within the gap will produce no action. Conversely, if the actionThresholds overlap (for example, 0.4 to 0.6 for queue for review, and 0.5 to 0.7 for auto_merge) and a score lands within the intersection (0.55 in our example) or on the touchpoint, the directive of queue for review takes precedence.

In step 604, match rules are created. Using Relevance-based matching, the client could create a match rule that contains a collection of attributes to test as a group.

In step 606, weights may be assigned to attributes to govern their relative importance in the rule. Weights can be set from 0.0 to 1.0. If the client does not explicitly set a weight for an attribute, it may receive a default weight of 1.0 during execution of the rule. For example, starting with all weights equal to 1.0 and perhaps start with actionThresholds of 0.0-0.5 for queue for review and 0.5-1.0 for auto_merge. Do some trial runs and examine the results. If too many obvious matches are being set to queue for review, then weights may be adjusted and the actionThresholds modified (e.g., to perhaps 0.0-0.7, and 0.7-1.0). The user may iterate and experiment until able to get optimized results with the data set.

In step 608, score comparison of entities is performed. In step 610, the relevance_based match rules use the match token classes in the same way as they are used in suspect and automatic match rules. However, the comparison of the two entities works differently. Every comparator class provides relevance value while comparing values. The relevance is in the range of 0 to 1. For example, BasicStringComparator returns 0 if two values are different. It returns 1 if two values are the identical. Fractional values can be a result of DistinctWordsComparator or other comparators. Every attribute has assigned weights according to the importance of the attribute. If the weight is not assigned explicitly then it is equal to 1 for the simple attributes or Maximum of the weights of sub-nested attributes for nested or reference attributes. If an attribute has multiple values, then the maximum value of relevance is selected.

In various embodiments, the following information describes participants of the formulae: RelevanceScore-AND—the relevance score of AND operand, the relevance score of the match rule; Nsimple—number of simple attributes (e.g., FirstName, LastName) participating in the AND operator directly; weighti—configured weight of i-th simple attribute; relevancei—calculated relevance of i-th simple attribute; Nnest—number of nested and reference attributes (e.g., Phone-no, Email-ID, Address) participating in the AND operator directly; weightj—configured weight of j-th nested or reference attribute; relevancej—calculated relevance of j-th nested/reference attribute; Nlogical—number of logical operands (For example, AND or OR) participating in the AND operator directly; relevancek—calculated relevance of k-th logical operand (the weight of a logical operand is fixed to 1; RelevanceScoreOR=max(relevance1, relevancei, . . . , relevanceN) relevancei-relevance of simple attribute, nested attribute, logical operand participating in the OR operand directly; RelevanceScoreNOT=1-RelevanceScoreAND,OR,exact, . . . (The relevance score of the NOT operand is equal to 1 minus the relevance score of the operand having this negation.)

BasicStringComparator provides the relevance values and the score is calculated as follows: true for First Name; true for LastName; false for Suffix. The score is calculated as $(1*1+1*1+0*1)/(1+1+1)=?=0.66$. With a score of 0.66 the directive for this pair will be set to queue for review.

The example below shows the use of the verifyMatches API when using Relevance-based matching. Noteworthy items are relevance values appear for every attribute comparison and relevance for the entire rule; Match action name is shown if the relevance is within the corresponding threshold range, and null if it is not within any actionThreshold range; Matched field will be true if the relevance is within any actionThreshold range.

In the match group configuration, the user may define Weights and actionThresholds. The weight property allows the client to assign a relative weight (strength) for each attribute. For example, the user may decide that Middle Name is less reliable and thus less important than First Name.

The actionThreshold allows the client to define a range of scores to drive a directive. For example, the user might decide that the match group should merge the profile pair if the score is between 0.9 to 1.0, but should queue the pair for review if the score falls into a lower range of 0.6 to 0.9.

The user can configure a relevance-based match rule with multiple action thresholds having the same action type but with a different relevance score range.

In the above example, the type is potential match for two different action thresholds. The user can differentiate such thresholds by assigning appropriate labels. The user can generate potential matches with different labels based on the range of the relevance score that allows the user to differentiate between higher and lower relevance score matches. The user can resolve matches quickly based on the label. In the example above, based on the relevance score, some potential matches can be considered for merging directly while others must be reviewed before any action is taken. The results of the API to get potential matches and the external match API will contain a relevance value and a matchActionLabel corresponding to each of the action type configured under the actionThreshold parameter. For more information, see Potential Matches API and External Match API.

Using operators like equals and notEquals prevents tokenization from generating tokens. These operators should not have an impact on tokenization, if we want to compare and conclude that even though address and/or email and/or phone are different, the remaining attributes match enough to take the score above the threshold.

In some embodiments, the following options equal, notEquals and in constraints: 1) strict (Boolean value with default=true): Allows the constraint to be skipped before the match tokens and relevance score are computed; 2) weight (decimal with default=0.0): Allows the constraint to participate in the relevance score calculation. (The two options and their default values ensure backward compatibility.)

Example Formulae to Calculate Relevance Score

The formulae have the following variables: Roperand—the relevance score of an operand (for example: exact, exactOrNull, exactOrAllNull, fuzzy, etc.); Rconstraint—the relevance score calculated for a constraint (for example: equals, notEquals, in); Woperand—configured weight for an operand; Wconstraint—configured weight for a constraint.

In at least some organizations, profiles are maintained across systems and there are instances where multiple records of the same profile exist. There may be inconsistencies in each record. In such cases, it would be beneficial to merge these records and maintain one record with the complete information. There are also instances where two profiles are related to each other.

There are certain match pairs that the user can configure such that the system can automatically take action on those. Other match pairs that require manual review are resolved using the Potential Match screen. Match rules and Match IQ (discussed herein) may be utilized to determine if two records are a match, not a match, or a potential match.

Match rules and Match IQ may be used to determine if two records are a match, not a match, or a potential match. The user can also use the Match Score to decide if a profile is a potential match. Based on predefined match rules, each potential match is given a Match Score and the higher the score, higher is the probability of it to be a potential match for the profile. In some embodiments, the Match Score of a potential match will have a value of more than 0 only if the standalone and incremental scores are configured for the match rules.

There may be instances when certain profiles, in spite of being a potential match, are excluded from the profile view due to these match rules. In such cases, the user can manually search by entering the search criteria in the "Search" field and include these profiles as potential matches.

The user may have the option of viewing the Potential Matches perspective in the classic mode or the new mode.

In various embodiments, Match IQ uses machine learning (ML) to simplify and accelerate the data matching process. With Match IQ, business users can easily create a model for matching the records, by simply selecting the entity type and related attributes, without or minimum IT help. They can then train the ML model with the active learning process by reviewing pairs of records and indicating which are a match and which are not. As users confirm the matches, machine learning adjusts the matching model and presents additional record pairs to further refine the model.

After a sufficient number of representative record pairs have been matched or not matched, the user can download and review the match results. A downloaded file may show a sample set of match results and a relevance score for each record pair. The higher the relevance score, the more likely the records match. If needed, the user can retrain the model by answering more questions or even creating an alternate model to compare the matching results.

After the results are satisfactory, the data steward or other user with approval authority can review, approve and publish the model to use with internal and/or external data. The user also provides publishing settings based upon the relevance score range—for example, to define that match pairs with a relevance score of 0.8 to 1 should be matched and merged.

The end-to-end process, driven and performed by business users, typically takes only a day or two to complete and produces the quality matches customers require. In some embodiments, Match IQ uses machine learning technology to help ensure unified and reliable data across virtually unlimited data sources. The ML matching model, created with active learning using resolutions of suspected matched pairs, can be effectively applied to future match pairs. This provides a consistent way for business users and data stewards to match and merge data for increased quality, reliability, and business value.

Once a matching model is trained, no user interaction is required but the model can be retrained if needed. Because match and merge operations are performed using these models and calculated relevance scores, the process is rapid, consistent, and reliable. As the business grows or changes, the models can easily be adjusted to accommodate additional data sources. This enables matching and merging at the scale and speed of business.

The streamlined matching process, which does not require IT specialists or coding, enables customers to get up and running faster and with less effort. Typically, they can progress from initial subscription to completing their match-and-merge operations in a matter of days. Compare this to the weeks or months required by more traditional approaches. This same process is used to perform matching for new data sources as they are added, providing additional time savings and increased productivity.

No definition of matching requirements is needed; instead, users select matched pairs and machine learning creates the models. This greatly reduces the possibility of matching requirements not being correctly identified that might generate incorrect matches or miss valid matches. In addition, because machine learning creates and adjusts the matching model without configuration by IT specialists, coding errors are a thing of the past. This not only reduces errors in the match-and-merge process, but it also saves significant time as it creates a repeatable process. Customers have an option to use both Match IQ and traditional rule-based matching together if needed.

With all the time saved by using Match IQ, those involved-data owners, data stewards, IT and other business users-will find they have more time available for work that adds value to the business. They can use their time to focus on creating better user experiences, data improvement initiatives or streamlining other processes.

Figure 7:
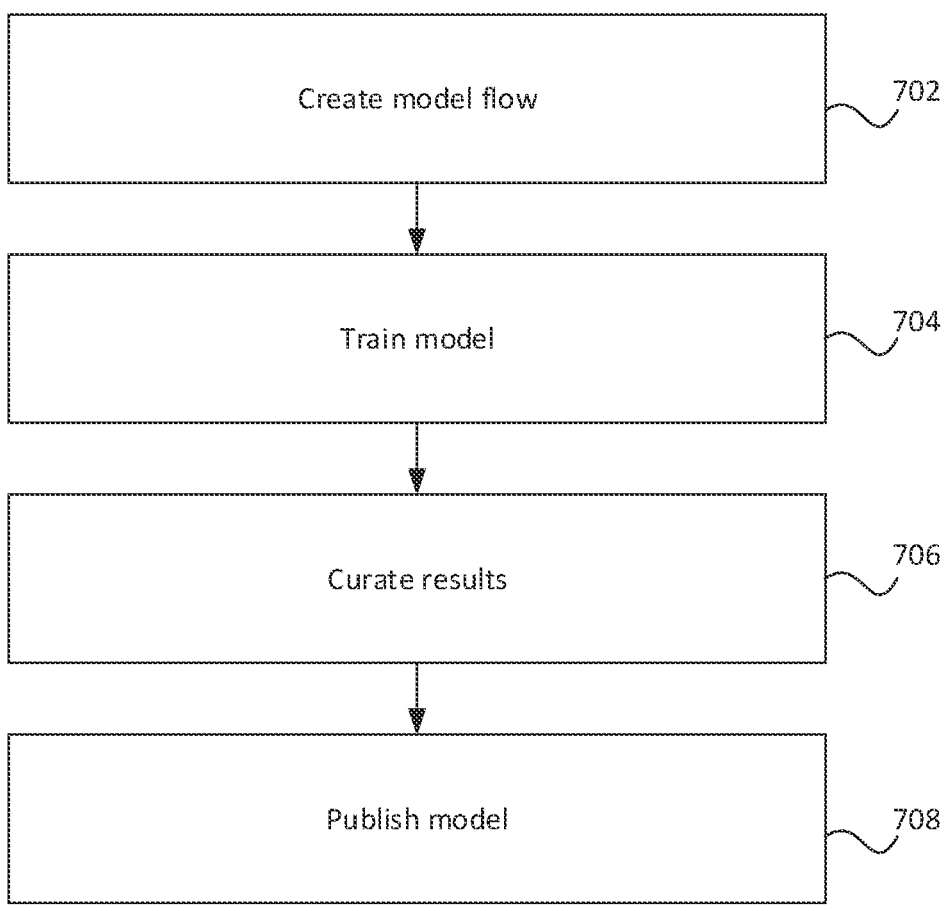
FIG. 7 depicts a high-level flowchart for MatchIQ.

FIG. 7 depicts a high level flowchart for MatchIQ in some embodiments. In step 702, the first step is to create a model flow by selecting entity types and attributes. In various embodiments, a graphical user interface may enable a user to select attributes to train the model (e.g., with a check system).

In step 704, the model is trained. When the user trains a model, the user identifies records as matches or non-matches (e.g., by answering a series of questions). After the completion of the Preparing Data stage, the model moves under the Training lane. At this stage, the model is ready for training. There can be variations where records are neither close to matches nor non-matches. Such records then become the input to the training process where the user may be prompted with questions seeking confirmation on whether a particular pair is a match or not.

A machine learning methodology may be utilized. For example, a neural network may be utilized for training. Alternately, as other examples, gradient boosted decision trees or random forests may be utilized.

In step 706, results are curated. In various embodiments, the graphical user interface may display details related to the model and results may be displayed (e.g., downloaded). Matches may be run and reviewed by the user to curate the results for further training and model improvement.

In step 708, the user may publish the model. The user may choose to publish the model for internal and external matching. In some embodiments, the user may select external or internal.

For example, if the user selects external, the model may be used to match data from an external file with the data in the tenant. If the user selects internal, the model may be used to match the data within your tenant along with the match rules configured for the tenant.

In various embodiments, the user may define a custom action and a corresponding relevance score range. This allows the user to execute custom actions for relevance scores that are received for relevance-based rules. If a match pair falls within the defined range, then the custom action is executed. In a specific implementation, the relevance score range the user specifies for one action cannot overlap with the relevance score of another custom action.

Advantageously, the techniques described above facilitate progressive stitching in an RDBMS. Specifically, it is not necessary to create a record for each data item to utilize matching rules. Accordingly, it is possible to start with a relatively small data model and increase complexity over time. With progressive stitching, a practically unmanageable collection of data items can be kept in a datastore until they can be matched and merged with records that have been clearly matched to real-world entities. The collection of data items can be referred to as "data points" that are stored in a data point datastore. Specifically, as used here, a data point is a data item that has not been explicitly matched to a real-world entity, though it will naturally be associated with a data source (from which the data point was received) and a real-world entity that may or may not be associated with another record in an object datastore that includes data items (records) that have been matched to real-world entities. When a data point is matched to a real-world entity using a matching engine, the data point is merged with an existing record, the EID of the data point is retained (typically as a legacy EID, though it could be promoted).

The engine responsible for merging data points with existing records can be characterized as a progressive stitching engine, which can itself be characterized as comprising a data point onboarding engine, a data point registration engine, a data point matching engine (which can match data points with one another or match data points with records), and a data point merging engine (which can merged data points, leaving them as merged data points, or merge data points with records, usually retaining the primary EID of the record and retaining the data point EID(s) as legacy EIDs). The data point onboarding engine and the data point registration engine can be the same as a data item onboarding engine and a data item registration engine but are called out for the conceptual distinction.

What is claimed is:

1. A system comprising:

one or more processors; and memory storing instructions that, when executed by the one or more processors, cause the system to perform:

assigning, by an entity identifier (EID) assignment engine, a data item EID to a data item;

onboarding, by a data point onboarding subengine, a data point;

assigning, by a data point registration subengine, a data point EID to the data point;

matching, by a data point matching subengine, the data point with the data item in a multitenant EID lineage-persistent relational database management system (RDBMS), wherein the multitenant EID lineage-persistent RDBMS retains EIDs for each piece of data, even if the data is merged or assigned a new EID, wherein the multitenant EID lineage-persistent RDBMS has a n-layer architecture, wherein the multitenant EID lineage-persistent RDBMS includes an industry-agnostic layer in a Layer 1 (L1) of the n-layer architecture, wherein the multitenant EID lineage-persistent RDBMS includes an industry-focused layer in a Layer 2 (L2) container of the n-layer architecture, wherein the multitenant EID lineage-persistent RDBMS includes a tenant layer in a Layer (L3) container of the n-layer architecture, wherein the L3 container inherits all data items from the L2 container, and wherein the data item comprises a record stored in an object datastore of the multitenant EID lineage-persistent RDBMS, the object datastore including records that have been matched to real-world entities;

merging, by a data point merging subengine in response to the matching, the data point with the data item to create a merged data item associated with the L3 container, wherein the data point is merged with the record in the object datastore while retaining a primary EID of the record as a primary EID of the merged data item and retaining the data point EID as a legacy EID in a legacy EID datastore associated with the multitenant EID lineage-persistent RDBMS;

changing, by a data item update engine, the merged data item, triggering survivorship and lineage EID promotion rules.

2. The system of claim 1, comprising a new dataset onboarding engine that receives a new dataset including the data item.

3. The system of claim 1, wherein the data point onboarding subengine receives a new dataset including the data point.

4. The system of claim 1, comprising an object registration engine that registers the data item in association with a source of the data item.

5. The system of claim 1, wherein the data point registration subengine registers the data point in association with a source of the data item.

6. The system of claim 1, wherein the data item EID references a real-world entity.

7. The system of claim 1, wherein the data point is a first data point and the data item is a second data point, and wherein the data point matching subengine matches the first data point with the second data point.

8. The system of claim 1, wherein the data point is a first data point, the data item is a second data point, and the merged data item is a merged data point, wherein the data point merging subengine merges the first data point with the second data point to create the merged data point, and wherein the data point EID is retained as a legacy EID of a first data point portion of the merged data point.

9. The system of claim 1, wherein when the data point is merged with the data item, the data item EID is promoted to a primary EID of the merged data item.

10. The system of claim 1, wherein when the data point is merged with the data item, the data point EID is retained as a legacy EID of a data point portion of the merged data item.

11. A method comprising:

assigning a data item entity identifier (EID) to a data item;

onboarding a data point;

assigning a data point EID to the data point;

matching the data point with the data item in a multitenant EID lineage-persistent relational database management system (RDBMS), wherein the multitenant EID lineage-persistent RDBMS retains EIDs for each piece of data, even if the data is merged or assigned a new EID, wherein the multitenant EID lineage-persistent RDBMS has a n-layer architecture, wherein the multitenant EID lineage-persistent RDBMS includes an industry-agnostic layer in a Layer 1 (L1) of the n-layer architecture, wherein the multitenant EID lineage-persistent RDBMS includes an industry-focused layer in a Layer 2 (L2) container of the n-layer architecture, wherein the multitenant EID lineage-persistent RDBMS includes a tenant layer in a Layer (L3) container of the n-layer architecture, wherein the L3 container inherits all data items from the L2 container, and wherein the data item comprises a record stored in an object datastore of the multitenant EID lineage-persistent RDBMS, the object datastore including records that have been matched to real-world entities;

merging, in response to the matching, the data point with the data item to create a merged data item associated with the L3 container, wherein the data point is merged with the record in the object datastore while retaining a primary EID of the record as a primary EID of the merged data item and retaining the data point EID as a legacy EID in a legacy EID datastore associated with the multitenant EID lineage-persistent RDBMS;

changing the merged data item, triggering survivorship and lineage EID promotion rules.

12. The method of claim 11, comprising receiving a new dataset including the data item.

13. The method of claim 11, comprising receiving a new dataset including the data point.

14. The method of claim 11, comprising registering the data item in association with a source of the data item.

15. The method of claim 11, comprising registering the data point in association with a source of the data item.

16. The method of claim 11, wherein the data item EID references a real-world entity.

17. The method of claim 11, wherein the data point is a first data point and the data item is a second data point, comprising matching the first data point with the second data point.

18. The method of claim 11, wherein the data point is a first data point, the data item is a second data point, and the merged data item is a merged data point, comprising merging the first data point with the second data point to create the merged data point, and retaining the data point EID as a legacy EID of a first data point portion of the merged data point.

19. The method of claim 11, comprising promoting the data item EID to a primary EID of the merged data item when the data point is merged with the data item.

20. The method of claim 11, comprising retaining the data point EID as a legacy EID of a data point portion of the merged data item when the data point is merged with the data item.

* * * * *